United States Patent
Jones et al.

(10) Patent No.: US 6,430,796 B1
(45) Date of Patent: Aug. 13, 2002

(54) APPARATUS FOR PERFORMING AUTOMATED MANUFACTURING OPERATIONS ON PANEL-SHAPED WORKPIECES

(75) Inventors: Darrell Darwin Jones, Mill Creek; James N. Buttrick, Jr., Seattle, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/563,596

(22) Filed: May 3, 2000

(51) Int. Cl.$^7$ ................................. B23P 11/00
(52) U.S. Cl. .................... 29/243.53; 29/34 B; 29/897.2
(58) Field of Search .................... 29/50, 897.2, 243.54, 29/243.53, 34 B, 33 K; 414/589; 180/6.48

(56) References Cited

U.S. PATENT DOCUMENTS

| | | | |
|---|---|---|---|
| 4,203,204 A | | 5/1980 | Murphy |
| 4,691,905 A | | 9/1987 | Tamura et al. |
| 4,864,702 A | | 9/1989 | Speller, Sr. et al. |
| 4,885,836 A | | 12/1989 | Bonomi et al. |
| 4,894,903 A | | 1/1990 | Woods |
| 4,955,119 A | | 9/1990 | Bonomi et al. |
| 5,033,174 A | | 7/1991 | Zieve |
| 5,105,515 A | | 4/1992 | Nelson |
| 5,139,245 A | | 8/1992 | Bruns et al. |
| 5,249,785 A | * | 10/1993 | Nelson et al. |
| 5,390,751 A | * | 2/1995 | Puetz et al. ............... 180/6.482 |
| 5,542,796 A | * | 8/1996 | Bratten et al. |
| 5,586,391 A | | 12/1996 | Micale |
| 5,604,974 A | | 2/1997 | Roberts et al. |
| 5,619,781 A | | 4/1997 | Ffield et al. |
| 5,664,311 A | | 9/1997 | Banks et al. |
| 5,699,599 A | | 12/1997 | Zieve |
| 6,029,352 A | * | 2/2000 | Nelson |
| 6,088,897 A | * | 7/2000 | Banks et al. |

FOREIGN PATENT DOCUMENTS

| | | |
|---|---|---|
| EP | 0 836 908 A2 | 4/1998 |
| EP | 1 151 813 A1 | 11/2001 |
| WO | WO 99/46079 | 9/1999 |

\* cited by examiner

*Primary Examiner*—David P. Bryant
*Assistant Examiner*—Steven Blount
(74) *Attorney, Agent, or Firm*—Alston & Bird LLP

(57) ABSTRACT

An apparatus for assembling panel-shaped workpieces such as aircraft wing panels includes a traveling gantry that supports a tool-holding frame on which are supported a plurality of tools such as drills, riveters, rivet shavers, inspection tools, and the like. The frame is movable along a plurality of axes and is rotatable about at least one axis for positioning the tools in relation to the workpiece. The apparatus also includes a fixture for holding a workpiece, the fixture comprising a plurality of slidable holders that can be extended or retracted along a horizontal direction generally perpendicular to the surfaces of a wing panel or the like. The holders have clamps and/or vacuum cups for engaging the workpiece to hold the workpiece in a desired position. The holders are retractable to create a clearance between the workpiece and the holders to allow the frame to be passed through the clearance. The gantry can be rotated about a vertical axis by differentially driving one wheel assembly along one of the rails relative to the other wheel assembly on the other rail. The tool-holding frame can comprise a U-shaped yoke that passes beneath a workpiece, or a four-sided frame that is open in the middle for receiving a workpiece therethrough. The tools can be slidably mounted on the frame for vertical movement therealong.

10 Claims, 5 Drawing Sheets

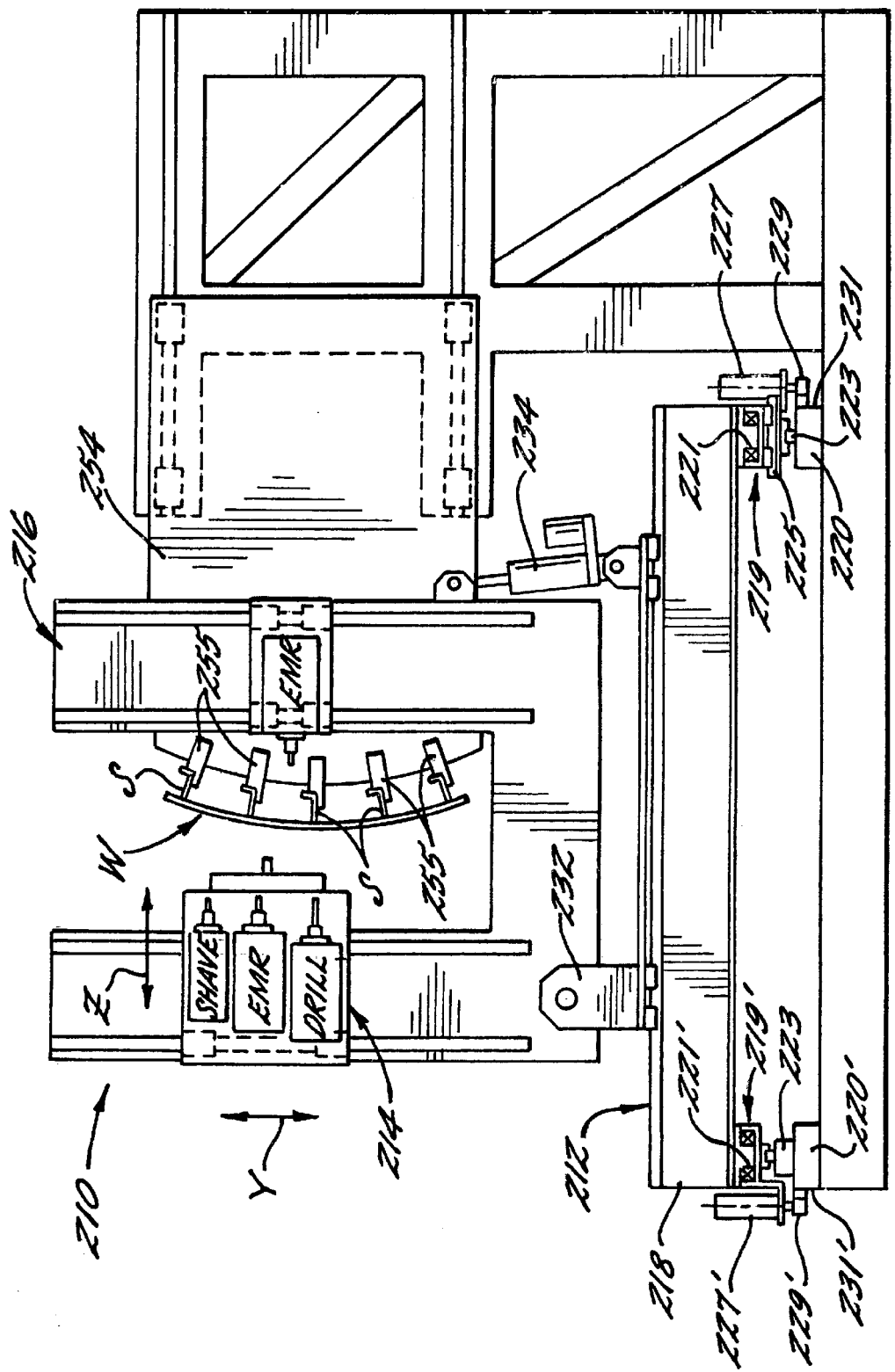

APPARATUS FOR PERFORMING AUTOMATED MANUFACTURING OPERATIONS ON PANEL-SHAPED WORKPIECES

FIELD OF THE INVENTION

The invention relates to automated assembly machines and, more particularly, to an apparatus for performing automated manufacturing and assembly operations on a panel-shaped workpiece such as a wing panel for an aircraft.

BACKGROUND OF THE INVENTION

In an effort to improve productivity in the manufacture of large aircraft assemblies such as wing panels, automated assembly machinery is increasingly being used in place of the manually operated equipment that for many years has been commonly used for fabricating aircraft. A variety of types of automated assembly devices have been developed or proposed for performing tasks such as drilling, riveting, and inspecting of wing panel assemblies and the like. For example, commonly owned U.S. Pat. Nos. 5,105,515 and 4,203,204 describe automated assembly tools for performing riveting and other operations on wing panels that are oriented vertically. A wing panel is held in a fixture by geared clamps positioned at the top and bottom of the panel, the clamps remaining positioned in their clamping positions throughout the manufacturing operations on the panel. Independently operable carriages on opposite sides of the panel support tools for movement along three mutually perpendicular axes.

U.S. Pat. No. 4,955,119 issued to Bonomi et al. describes a robotic machining center having a vertical column translatable on rails along an X-axis, a ram mounted on the vertical column for vertical movement therealong in a Y-axis direction, and a U-shaped yoke mounted on the ram. The ram is extensible in a Z-axis direction. The yoke has spaced opposed legs that support tools. The yoke is rotatable relative to the ram about a horizontal axis parallel to the X-axis. The vertical column is rotatable about a vertical axis passing therethrough. The workpiece is held in an automatic flexible or adjustable fixture that is schematically illustrated but is not further described in any detail.

U.S. Pat. No. 4,864,702 issued to Speller, Sr. et al. describes a five-axis riveter having a large and complex frame that includes a pair of spaced-apart sides that straddle a workpiece and pass therealong as the frame is carried along a rail system formed in a supporting surface. Independently operable carriages are mounted on the frame sides, and heads are mounted on the carriages for supporting riveting tools. The carriages are movable vertically along the frame sides. The tools are movable toward and away from the workpiece. The heads are rotatable about two different axes. The workpiece is held in position for machining by a fixture that is supported above the supporting surface by a plurality of retractable supports each of which can be lowered independently of the others to provide clearance between the supporting surface and the fixture for passage of a lower portion of the frame through such clearance.

In accordance with current methods employed by the assignee of the present application, wing assemblies are fabricated with massive traveling C-frame hydraulic riveting machines. The wing panels are positioned with their major surfaces in a horizontal position. The C-frame tooling is not practical for the installation of hand fasteners and, accordingly, the automated C-frame riveting machine is used for installing rivets and workers manually install the hand fasteners. Many crane-assisted moves of the wing panels are typically required in order to accommodate the combination of machine installation of rivets and manual installation of hand fasteners.

SUMMARY OF THE INVENTION

The present invention provides an automated assembly apparatus for performing assembly operations on panel-shaped workpieces such as wing panels or the like, in which the workpiece is held with its major surfaces in a vertical orientation. A unique fixture is employed for holding the workpiece, enabling a frame supporting automated tools to be passed along the workpiece so as to perform various work operations such as drilling, installation of rivets, installation of hand fasteners, shaving of rivet heads, inspection, and other operations. The apparatus enables many workpiece configurations to be handled without major modification of the workpiece-holding fixture or the frame and its associated traveling support. The invention enables wing panels to be assembled in one apparatus capable of installing both machine-installed and hand-type fasteners, thus reducing tooling and facility costs relative to current methods for assembling wing panels. Crane moves of the wing panel are also substantially reduced, enabling further cost reductions.

To these ends, an apparatus in accordance with a preferred embodiment of the invention comprises a gantry, a tool-holding frame supported on the gantry, at least one tool mounted on the frame, and a workpiece-holding fixture for holding the workpiece. Either the gantry or the workpiece-holding fixture is operable to translate relative to the other along a first horizontal direction parallel to a first axis. The frame is mounted on the gantry and has a middle portion and opposed leg portions joined to the middle portion in spaced relation for receiving the workpiece therebetween. The frame is carried by the gantry such that the leg portions travel relative to the workpiece along opposite sides thereof for positioning of the tool carried by the frame at various positions along the workpiece. The workpiece-holding fixture holds the workpiece such that a length dimension of the workpiece extends generally parallel to the first axis. The fixture includes a plurality of holders spaced apart in the first direction, each holder being operable to extend generally horizontally along a direction generally perpendicular to the first direction so as to engage a side of the workpiece and support the workpiece, and to retract away from the side of the workpiece engaged by the holder so as to provide clearance between the workpiece and the holder for passage of the frame while the other holders remain engaged with the workpiece. The holders may support workpiece-holding devices such as clamps and/or suction devices. Advantageously, the holders can be extended or retracted to selectively variable degrees so that workpieces of various configurations can readily be supported.

The tool-holding frame advantageously comprises a U-shaped yoke having two spaced leg portions that support the tool and preferably support a plurality of tools that can be selectively operated for performing various work operations on the workpiece. The U-shaped yoke preferably is oriented such that a middle portion of the yoke from which the two leg portions project passes beneath the workpiece and the leg portions project upwardly on opposite sides of the workpiece. The leg portions of the yoke can support various types of tools, including drill motors, riveters, part-clamping tools, rivet shavers, two-piece fastener installation tools, inspection tools, and the like.

The gantry in one preferred embodiment of the invention is movable while the workpiece is held stationary in the fixture. The gantry is mounted on a pair of parallel spaced rails. Preferably, the gantry is rotatable about a vertical axis by differential movement of one wheel assembly on one of the rails relative to another wheel assembly on the other rail. The two wheel assemblies are independently driven along the rails by two actuators.

The tool-holding frame preferably is mounted on the gantry such that the frame can be moved vertically along the gantry for positioning a tool at various vertical positions along the workpiece. Alternatively or additionally, the tools can be mounted on the frame so as to be movable vertically along the frame. In accordance with a further preferred embodiment of the invention, the frame is rotatable relative to the gantry about a horizontal axis that extends generally in the lengthwise direction of the workpiece. Furthermore, the frame preferably is movable along the gantry in a horizontal direction that extends generally perpendicular to the opposite surfaces of the workpiece. Accordingly, the frame can be positioned in various orientations and positions for accommodating workpieces that are non-linear in the vertical direction and/or in the lengthwise direction.

The invention thus enables automated assembly of wing panels or other panel-type workpieces to be performed in one apparatus with a minimal requirement for moves of the workpiece, and with reduced tooling requirements relative to current methods used for assembling wing panels. The apparatus in accordance with the invention can accommodate workpieces of various configurations without requiring a separate dedicated workpiece-holding fixture for each configuration.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 5 is an end elevation of an apparatus in accordance with yet another embodiment of the invention.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
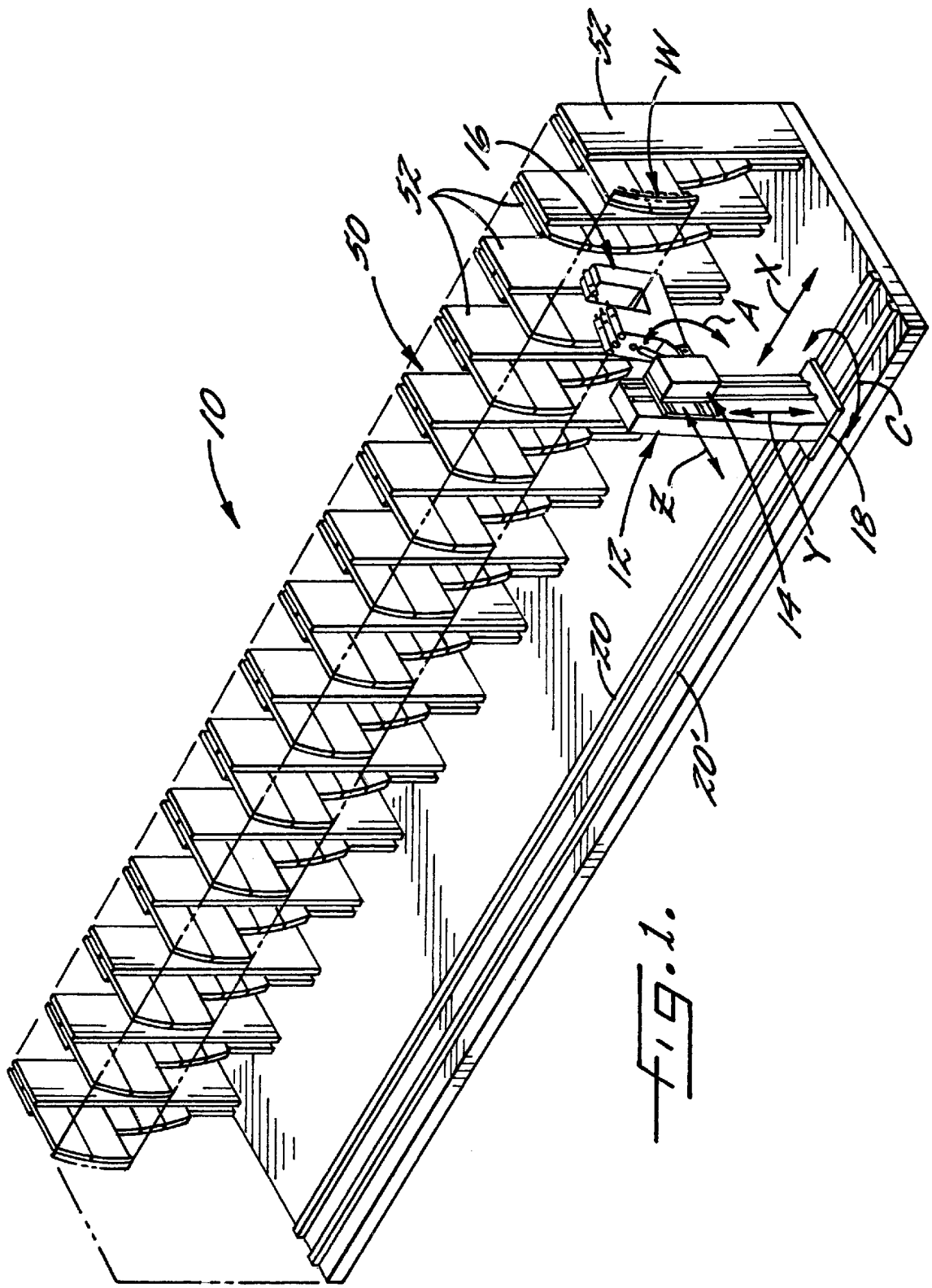
FIG. 1 is a perspective view of an automated assembly apparatus in accordance with a preferred embodiment of the invention.
Figure 2:
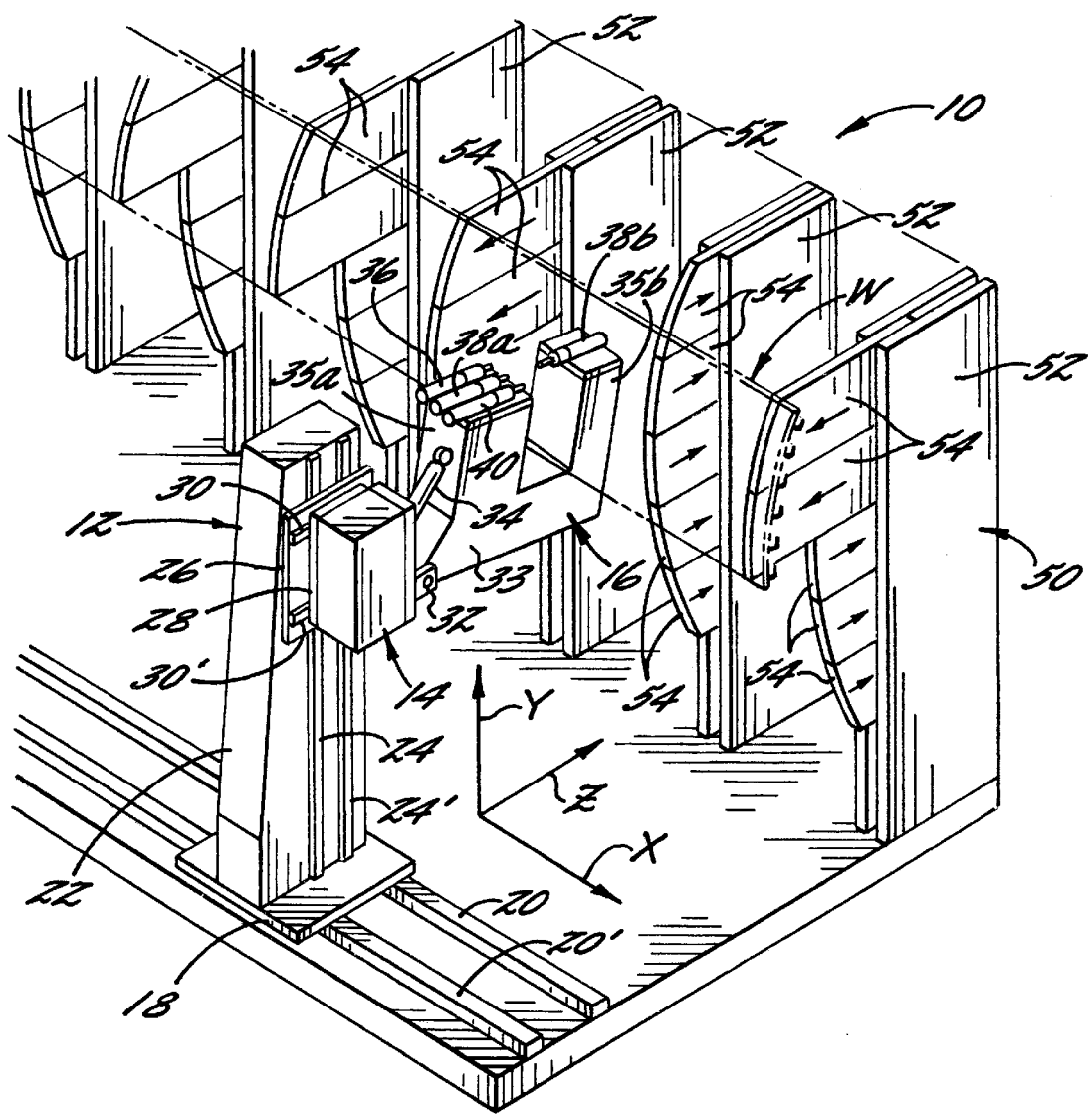
FIG. 2 is an enlarged portion of FIG. 1, showing the gantry and frame of the apparatus in greater detail.

With reference to FIGS. 1 and 2, an apparatus in accordance with a first preferred embodiment of the invention is depicted and is broadly denoted by reference numeral 10. The apparatus 10 comprises a traveling gantry 12 that supports a carriage 14 on which is mounted a tool-holding frame or yoke 16. The gantry 12 in the embodiment illustrated in FIGS. 1 and 2 comprises a support platform 18 adapted to travel back and forth parallel to an X-axis direction guided by a pair of spaced parallel rails 20 and 20', and a vertical column 22 mounted on the support platform 18. The vertical column 22 includes a pair of spaced parallel rails 24, 24' that extend vertically along the column. The carriage 14 includes a base 26 that is mounted so as to travel upward and downward along the rails 24, 24' along a Y-axis direction that is perpendicular to the X-axis direction, and a slide 28 that is mounted on the base 26 so as to travel back and forth along a pair of rails 30, 30' mounted on the base 26 and extending along a Z-axis direction that is perpendicular to the X-axis and Y-axis directions.

The slide 28 supports the yoke 16. Accordingly, the yoke 16 can be moved along three mutually perpendicular directions by suitably controlling movement of the gantry 12, the carriage base 26, and the slide 28. Each of these movable components is driven by one or more actuators (not shown in FIGS. 1 and 2) of a suitable type, such as hydraulic or pneumatic cylinders, electric motors, linear magnetic motors, or other types of actuators known in the art.

Figure 3:
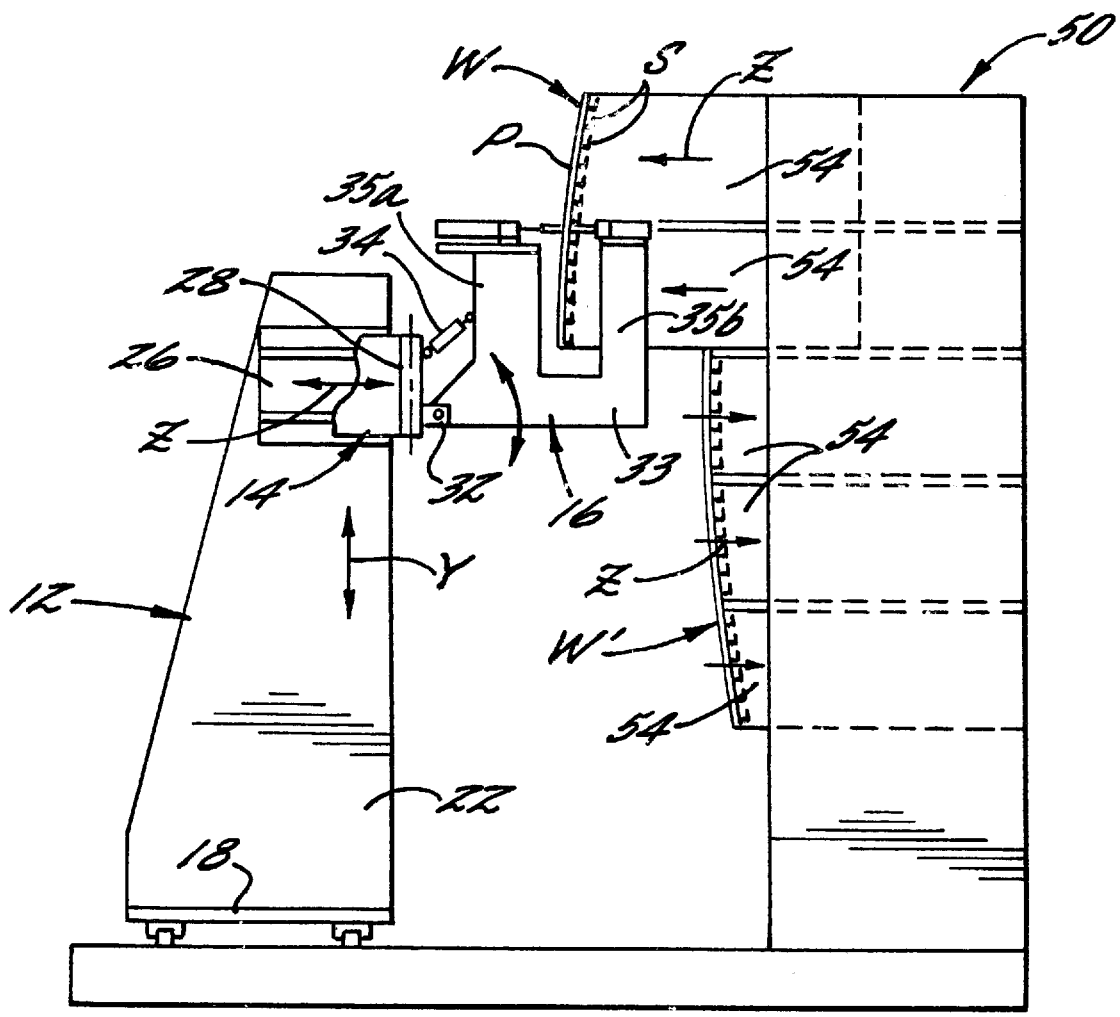
FIG. 3 is an end elevation of an apparatus in accordance with another preferred embodiment of the invention.

The yoke 16 is rotatably mounted on the slide 28 so as to be rotatable about a horizontal axis that is parallel to the X-axis direction along which the gantry 12 travels. The mounting of the yoke 16 is illustrated in FIG. 3, which shows an apparatus substantially corresponding to that of FIGS. 1 and 2 except for relatively minor differences such as the configuration of the slide 28. The yoke 16 advantageously is coupled to the slide 28 by a pivotable coupling 32 at a bottom corner of the yoke such that the yoke can pivot about its bottom corner. A linear actuator 34, such as a hydraulic or pneumatic cylinder, is connected between the slide 28 and the yoke 16 at a location spaced vertically above the coupling 32. Extension or retraction of the actuator 34 causes the yoke 16 to be rotated in one direction or the other relative to the slide 28.

As best seen in FIG. 2, the yoke 16 includes a middle portion 33 and a pair of spaced leg portions 35a and 35b, and the leg portions support a plurality of tools 36, 38a, 38b, and 40. Each of the tools is operable for performing a work operation on a workpiece W disposed between the leg portions 35a, 35b of the yoke. As an illustrative example, the tool 36 may comprise a drill for drilling a hole in the workpiece W. The tools 38a, 38b may comprise cooperative riveting tools that engage the workpiece W from opposite sides to apply a rivet into a hole and to upset the rivet. Various types of riveting tools can be used, such as electromagnetic riveters (EMR) or hydraulic riveters. The tool 40 may comprise a rivet shaver for shaving off a rivet head flush with the surface of the workpiece W. Where a cooperative pair of opposed tools for engaging both sides of the workpiece are used, such as tools 38a, 38b, preferably at least one of the tools is movable relative to the yoke 16 in a direction toward and away from the opposing tool so that the tools can be simultaneously brought into engagement with the opposite sides of the workpiece to perform an operation, and the tools can then be moved relatively apart to permit the yoke to be moved to a new location of the workpiece for the next operation. Other types of tools can also be mounted on the yoke 16, such as clamping tools, inspection tools, two-part fastener installation tools, or others known in the art. It should be noted that the ability of the yoke 16 to be rotated about the horizontal axis, which ability is provided by the pivotal coupling 32 and the actuator 34, enables the yoke to be positioned such that the tools supported on the yoke have their axial directions oriented substantially perpendicular to the surface of a workpiece even when the workpiece surface is curved in the vertical direction or is otherwise not precisely vertical. Thus, as an example, holes drilled into the workpiece can be normal to the workpiece surface.

With reference to FIGS. 1–3, the apparatus 10 also includes a workpiece-holding fixture 50 operable for holding and supporting the workpiece W in a stable position. The fixture 50 comprises a plurality of adjustable holding devices 52 spaced apart at intervals along the X-axis direction (i.e., along the lengthwise direction of the workpiece). Each holding device 52 includes one or more holders 54 that are slidable back and forth along a generally horizontal direction that is generally parallel to the Z-axis direction. Thus, the holders 54 are movable toward and away from one side of the workpiece W. In their extended positions, the holders 54 are capable of engaging the workpiece when the workpiece is disposed between the leg portions 35a, 35b of the yoke 16. Each holder 54 supports one or more fixing devices (not shown in FIGS. 1–3) such as clamps and/or vacuum cups or the like, which engage the workpiece to hold the workpiece in a stable position, and which can also hold other parts to be attached to the workpiece. For example, the holders 54 can support computer-controlled clamps that hold wing stringers S in position to be attached to a wing panel P, and can also support computer-controlled vacuum cups that attach to the wing panel and suction it against supporting surfaces of the holders. Preferably, each holding device 52 includes a plurality of slidable holders 54 spaced apart in a vertical direction. Selected ones of the holders 54 can be activated to engage a workpiece such that workpieces of various configurations can be held. For instance, as shown in FIGS. 1–3, there are five holders 54 positioned one above another, and the top two holders engage a workpiece W and are extended to position the workpiece so that the yoke 16 can be passed along the workpiece. As illustrated in FIG. 3, if desired, a second workpiece W' can be held by other ones of the holders 54 in a retracted position out of the way of the yoke 16 for later processing after the work operations have been completed on the first workpiece W.

Each holder 54 is slidable independently of the other holders. Accordingly, at a given station along the X-axis direction, the holders 54 at that station can be disengaged from the workpiece and retracted so as to create a clearance between the workpiece and the holders 54 to enable the yoke 16 to pass through such clearance. This is best illustrated in FIG. 2, where the second station from the right-hand portion of the drawing has the top two holders 54 retracted away from the workpiece so that the yoke 16 can pass by. The holders 54 at the other stations remain engaged with the workpiece so that the workpiece is securely held in the desired position. After the yoke 16 has passed by the position occupied by the retracted holders 54, the holders are extended back toward the workpiece and are engaged with the workpiece. It should be noted that the holders 54 do not have to be dedicated for a specific workpiece configuration, but can instead be reconfigurable tooling such as programmable pogos or the like.

Figure 4:
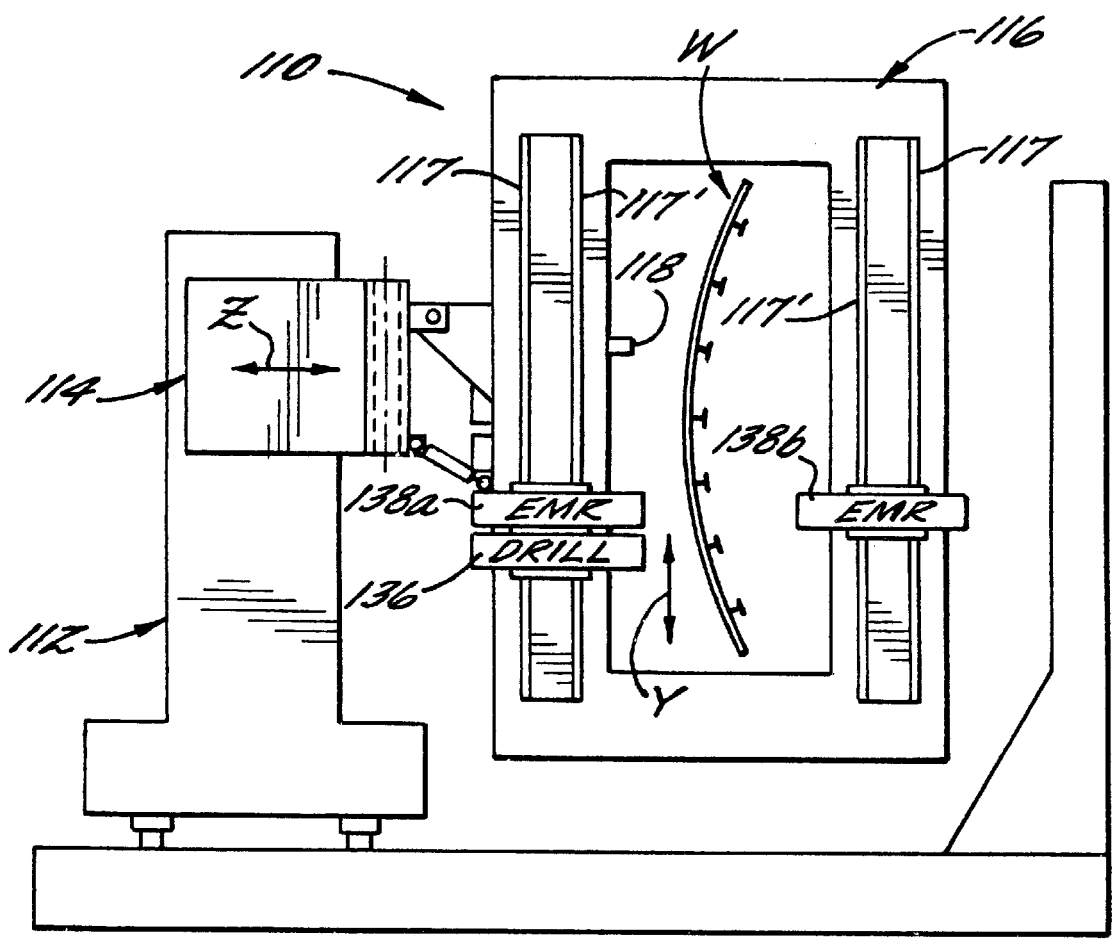
FIG. 4 is an end elevation of an apparatus in accordance with a still further embodiment of the invention.

An alternative embodiment of the invention is depicted in FIG. 4. The apparatus 110 shown in FIG. 4 is substantially similar to that of FIGS. 1–3, except that the tool holding frame 116 is not U-shaped but rather is a four-sided frame open in the middle for receiving a workpiece therethrough. Additionally, the frame 116 supports pairs of rails 117, 117' on which tools 136, 138a, and 138b are mounted for vertical movement along the frame. The ability to move the tools vertically on the frame enables the tools to be repositioned vertically without having to raise or lower the entire frame, and thus the actuation power required for vertical repositioning of the tools is considerably reduced since the tools are much less massive than the entire assembly of the carriage 114, frame 116, and tools 136, 138a, and 138b. The ability of the tools to move vertically on the frame 116 also enables the tools to reach positions closer to and farther from the underlying support surface than would be the case if the tools were fixed at a position midway up the frame 116 and the carriage 114 were vertically moved along the gantry 112 in order to reposition the tools. Furthermore, by providing the tooling with the ability to move vertically along the frame 116, the overhead space requirement for the apparatus can be reduced, thus allowing the apparatus to be housed in a "low bay" floor space rather than a more-costly "high bay" space. The embodiment of FIG. 4 also differs from that of FIGS. 1–2 in that the gantry 112 is not mounted on rails but rather is operable to travel along a supporting surface. The gantry 112 may comprise, for example, a forklift-type vehicle that is driven along the supporting surface. The frame 116 may support one or more sensors 118 operable to detect certain predetermined features on a workpiece and to provide a signal indicative of proximity to such features for controlling movement of the gantry 112.

It may be desirable in some instances to provide the yoke or frame with a capability of rotating about a vertical axis. For example, where a wing panel has a shape that is curved in its lengthwise direction (such as a wing panel "gull wing" bend), it is desirable to be able to rotate the tooling about a vertical axis so that the direction along which a hole is drilled or a fastener is inserted is substantially perpendicular to the outer surface of the wing panel. In accordance with a preferred embodiment of the present invention, the capability of vertical rotation of the tooling can be provided by designing the gantry to rotate about a vertical axis. FIG. 5 depicts an apparatus 210 embodying this further feature of the invention. The apparatus 210 includes a gantry 212 that is operable to travel on a pair of spaced rails 220, 220'. The gantry 212 has a support platform 218, and a pair of wheel assemblies 219, 219' are affixed to a lower surface of the support platform 218 and are respectively engaged with the rails 220, 220' for enabling the gantry to roll along the rails. The wheel assembly 219 includes a rotary bearing 221 affixed to the support platform with the rotary axis of the bearing oriented vertically, and a wheel 223 adapted to roll along an upper surface of the rail 220. The wheel 223 is coupled with the bearing 221 so that the wheel 223 can be rotated about the vertical rotary axis of the bearing. The wheel 223 is mounted on a slide 225 that is slidably connected to the bearing 221 so that the wheel 223 can slide relative to the bearing and support platform along a horizontal direction generally perpendicular to the X-axis direction along which the rail 220 extends. An actuator 227 is supported on the slide 225, and is operable to rotatably drive a gear 229 about a vertical axis. The gear 229 is in meshing engagement with a toothed side surface 231 of the rail 220. Thus, operation of the actuator 227 causes the wheel assembly 219 to be driven along the rail 220, the direction of travel being dictated by the direction of rotation of the gear 229.

The wheel assembly 219' is substantially similar to that of wheel assembly 219, except that there is no slide. Thus, the wheel assembly 219' includes a rotary bearing 221' affixed to the support platform, a wheel 223' coupled with the bearing, an actuator 227' coupled with a gear 229', and a toothed outer surface 231' of the rail 220' in meshing engagement with the gear 229'. Operation of the actuator 227' causes the wheel assembly 219' to be driven along the rail 220'. The gantry is moved along the rails 220, 220' by simultaneous operation of the two actuators 227, 227'. It will be recognized, therefore, that by differentially driving one of the wheel assemblies along its rail relative to the other wheel assembly, the gantry 212 can be rotated about a vertical axis. The slide 225 on the wheel assembly 219 enables the two wheel assemblies to move apart so as to allow the rotational movement of the support platform 218 about a vertical axis.

It will be noted that the apparatus 210 shown in FIG. 5 differs from the previously described embodiments of the invention in that the gantry rails 220, 220', are not both located to one side of a workpiece W being processed, but rather are located beneath and on opposite sides of the workpiece. The tool-holding frame or yoke 216 is disposed atop the support platform 218 of the gantry 212 and includes a pivotal coupler 232 pinning one corner of the yoke to the gantry and an actuator 234 connected between the gantry and the yoke for rotating the yoke about a horizontal axis. A workpiece holder 254 is schematically illustrated in FIG. 5 and includes a plurality of actuatable clamps 255 for holding wing stringers S in position for attachment to the wing panel.

Many modifications and other embodiments of the invention will come to mind to one skilled in the art to which this invention pertains having the benefit of the teachings presented in the foregoing descriptions and the associated drawings. For example, although the apparatus 10, 110, 210 described above have gantries that are movable while the workpiece is held fixed, the invention also encompasses an apparatus in which the gantry remains in one place and the workpiece is fed through the apparatus by a traveling workpiece-holding fixture. Other modifications to the preferred embodiments described and illustrated herein can also be made. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for performing manufacturing operations upon a workpiece, comprising:

a gantry;

a frame mounted on the gantry, the frame having a middle portion and opposed leg portions joined to the middle portion in spaced relation for receiving the workpiece therebetween;

at least one tool mounted on one of the leg portions of the frame and operable to perform an operation upon the workpiece; and a fixture for holding the workpiece such that a length dimension of the workpiece extends generally parallel to a generally horizontal first axis and the workpiece is disposed between the leg portions of the frame, the fixture including a plurality of holders spaced apart in a first horizontal direction parallel to said first axis, each holder being operable to extend generally horizontally along a direction generally perpendicular to said first horizontal direction so as to engage a side of the workpiece and to support the workpiece;

wherein one of the gantry and the fixture is operable to travel relative to the other along the first horizontal direction so as to move the workpiece relatively through the frame, and wherein the holders of the fixture are operable to retract away from the side of the workpiece engaged by the holder so as to provide a clearance between the workpiece and said holder for passage of the frame through said clearance while the other holders remain engaged with the workpiece.

2. The apparatus of claim 1, wherein the gantry is adapted to reside on one side of the workpiece and the frame is supported in cantilevered fashion from the gantry, and the holders all engage the other side of the workpiece.

3. The apparatus of claim 1, wherein each holder is operable to be extended and retracted by selectively variable amounts for accommodating workpieces of various configurations.

4. The apparatus of claim 1, further comprising a pair of spaced parallel rails extending along said first horizontal direction, the gantry being operable to travel along the rails.

5. The apparatus of claim 4, wherein the gantry includes a first wheel assembly that engages one of the rails for rolling therealong and a second wheel assembly that engages the other rail for rolling therealong, and wherein the gantry is operable to rotate about a vertical axis by differential movement of one of said wheel assemblies along the respective rail relative to the other wheel assembly.

6. The apparatus of claim 1, wherein the frame is generally U-shaped and is oriented such that the middle portion thereof passes beneath the workpiece and the leg portions of the yoke project upwardly from the middle portion on opposite sides of the workpiece.

7. The apparatus of claim 1, wherein the frame is rotatably mounted on the gantry so as to be rotatable relative to the gantry about a horizontal axis generally parallel to said first horizontal axis.

8. The apparatus of claim 1, wherein the frame is slidably mounted on the gantry so as to be translatable relative to the gantry along a second horizontal direction generally perpendicular to said first horizontal direction.

9. The apparatus of claim 1, wherein the frame is slidably mounted on the gantry so as to be translatable vertically along the gantry.

10. The apparatus of claim 1, wherein the gantry comprises a vehicle adapted to travel along a generally planar supporting surface, and further comprising a sensor fixed relative to the gantry and operable to detect one or more predetermined features on the workpiece and to provide a signal indicating proximity to said one or more features for controlling movement of the gantry along said supporting surface.

* * * * *